United States Patent
Murata et al.

(10) Patent No.: US 7,947,325 B2
(45) Date of Patent: May 24, 2011

(54) METHODS FOR MANUFACTURING FLEXIBLE TRANSFER BODY AND FLEXIBLE OPTICAL DISC AND FLEXIBLE OPTICAL DISC MANUFACTURED THEREBY

(75) Inventors: Shozo Murata, Kanagawa (JP); Shinji Aoki, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 1187 days.

(21) Appl. No.: 11/362,944

(22) Filed: Feb. 28, 2006

(65) Prior Publication Data
US 2006/0198981 A1 Sep. 7, 2006

(30) Foreign Application Priority Data
Mar. 1, 2005 (JP) ................. 2005-055870

(51) Int. Cl.
*B05D 3/12* (2006.01)
*B29D 17/00* (2006.01)
(52) U.S. Cl. ....... 427/162; 427/164; 427/240; 264/1.33; 264/2.1; 264/311
(58) Field of Classification Search ................. 427/240, 427/164, 385.5, 162; 118/52; 264/1.33, 264/2.1, 311
See application file for complete search history.

(56) References Cited

U.S. PATENT DOCUMENTS

| | | | |
|---|---|---|---|
| 4,312,823 A | 1/1982 | Kraakman et al. | |
| 6,632,476 B2 * | 10/2003 | Nakamura et al. | 427/240 |
| 2003/0137922 A1 * | 7/2003 | Ro et al. | 369/283 |
| 2004/0228260 A1 * | 11/2004 | Murata et al. | 369/275.1 |
| 2005/0048202 A1 * | 3/2005 | Komaki et al. | 427/240 |
| 2005/0128897 A1 * | 6/2005 | Yamasaki et al. | 369/44.27 |

FOREIGN PATENT DOCUMENTS

| | | |
|---|---|---|
| JP | 53-116105 | 10/1978 |
| JP | 3-9835 | 1/1991 |
| JP | 6-60423 A | 4/1994 |
| JP | 9-161329 A * | 6/1997 |
| JP | 2942430 B2 | 6/1999 |
| JP | 11-273147 A | 10/1999 |
| JP | 2004-355786 | 12/2004 |

OTHER PUBLICATIONS

English translation of JP 9-161329 A, published Jun. 1997.*

* cited by examiner

*Primary Examiner* — Kirsten C Jolley
(74) *Attorney, Agent, or Firm* — Dickstein Shapiro LLP (57) ABSTRACT

In a flexible transfer body employing curable resin as a transfer material, thickness unevenness in a substrate and a transfer layer is reduced and the thickness of the transfer layer is made to be uniform. Liquid curable resin is coated onto a rotation center or the vicinity of the rotation center of a mold, which is a rotator having a functional form on a surface thereof. A flexible film is brought into contact with a surface of the coated curable resin in a liquid state and the curable resin is spread to the circumferential edge of the mold by a centrifugal force. And the curable resin is cured by supplying chemical or thermal energy thereto and the curable resin is separated from the mold, thereby obtaining a flexible transfer body in which the curable resin is transferred to the film.

5 Claims, 5 Drawing Sheets

METHODS FOR MANUFACTURING FLEXIBLE TRANSFER BODY AND FLEXIBLE OPTICAL DISC AND FLEXIBLE OPTICAL DISC MANUFACTURED THEREBY

BACKGROUND OF THE INVENTION

1. Field of the Invention

The present invention relates to a method for manufacturing a flexible transfer body employing curable resin as a transfer material. Specifically, the present invention relates to methods for manufacturing a flexible transfer body and a flexible optical disc in which the unevenness of the thickness of a substrate and a transfer layer thereof is reduced and to a flexible optical disc manufactured by such a method.

2. Description of the Related Art

In recent years, optical discs have been widely used as recording media for recording and reproduction since they are removable and have massive storage capacity. The optical discs include a transfer layer formed on a polycarbonate substrate usually having a thickness of 1.2 mm or 0.6 mm. Information is recorded on the transfer layer and the information is reproduced. In order to condense light on the recording surface of the transfer layer used for performing recording and reproduction, it is necessary to have position accuracy on the recording surface for optical pickup upon recording and reproduction. Thus, the substrate is made flat to obtain rigidity and the optical pickup is servo-controlled to achieve the position accuracy.

Moreover, research and development of Blu-ray discs, for example, has been promoted in which the diameter of an optical spot is further reduced by increasing the numerical aperture (NA) of an objective lens and by producing laser light with a shorter wavelength so as to improve the recording capacity of the optical discs. On the other hand, in order to increase the numerical aperture (NA) of the objective lens, the surface deflection (tilt) of the substrate must be reduced. Thus, for example, the plane accuracy of a manufactured substrate is improved and a tilt (surface deflection) servomechanism is mounted for the pickup, or a thin cover layer with a thickness of about 0.1 mm is disposed on the transfer layer and a tilt (surface deflection) margin is enlarged by performing recording and reproduction on the cover layer side.

It is possible to reduce the substrate tilt (surface deflection) of an optical disc using a designed material or manufacturing method. However, the manufacturing cost of the optical discs is increased. Further, mounting the tilt (surface deflection) servomechanism for the optical pickup also increases the cost of the optical pickup.

Upon performing reproduction from the transfer layer side without passing through the substrate of the optical disc, only a length of about 0.1 mm is provided for the distance between the surface of the transfer layer and the objective lens. Thus, when a normal optical disc is rotated as a rigid body, it is necessary to reduce the surface deflection and improve the chucking accuracy of a chucking apparatus for the optical disc in order to avoid a collision between the optical disc and the objective lens. However, these are also problematic in that the costs of the optical disc and the recording/reproduction apparatus are increased.

Figure 4:
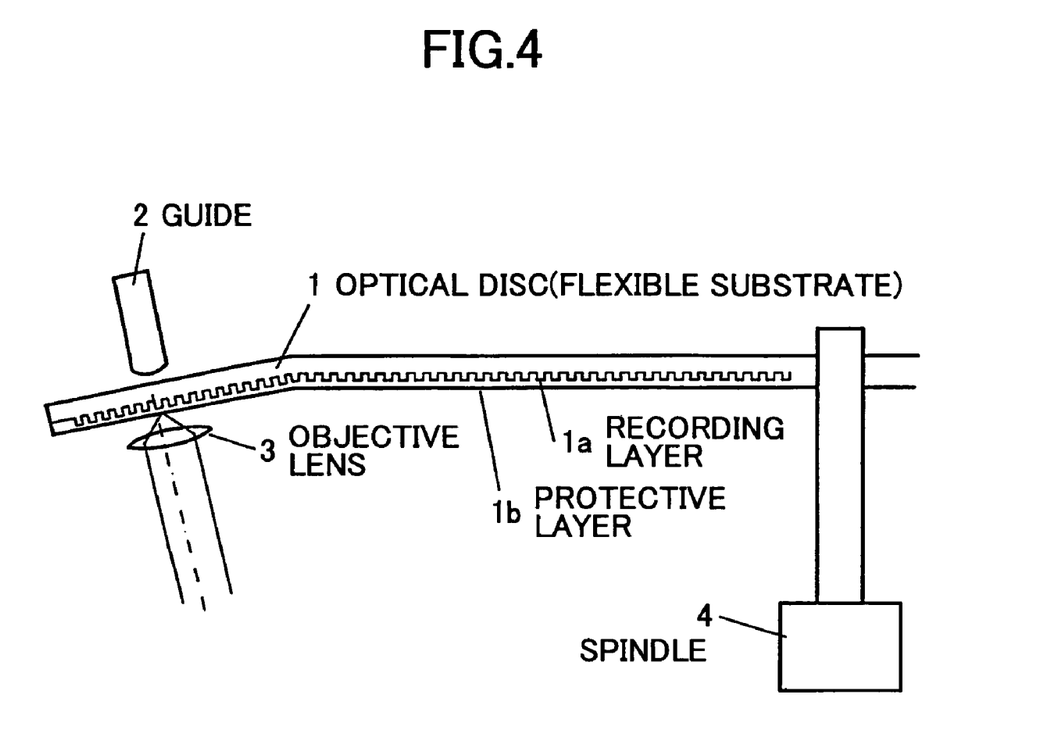
FIG. 4 is a cross-sectional view of a flexible optical disc with a guide and an objective lens.

In view of this, research and development of an optical disc has been promoted in which an optical disc 1 is made to have flexibility as shown in FIG. 4 without mechanically improving the plane accuracy of the optical disc as a rigid body. In addition, a guide 2 is disposed on the opposite side of a recording/reproduction surface including a recording layer 1a and a protection layer 1b and an objective lens 3 for optical pickup is disposed on the recording/reproduction surface side such that the optical disc 1 having flexibility is held between the objective lens 3 and the guide 2. The optical disc 1 is aerodynamically levitated (Bernoulli's method: non-contact levitation) by the rotation thereof using the guide 2, thereby stabilizing the position of the recording/reproduction surface with respect to the objective lens 3 and reducing the amount of the surface deflection of the optical disc 1 to almost zero.

Examples of conventional methods for manufacturing the substrate of the optical disc having flexibility (hereafter referred to as a flexible optical disc) include a heat press method where a surface of a flexible sheet such as a PET (polyethylene terephthalate) film is coated with thermoplastic resin or thermosetting resin, a minute pattern of concavity and convexity on a stamper is transferred and the resin is cured by heating, and a transfer layer is subsequently formed. The examples of conventional methods also include a 2P (Photo Polymerization) method (refer to Patent Document 1) where the surface of the flexible sheet is coated with ultraviolet-curable resin, the minute pattern of concavity and convexity on the stamper is transferred and the resin is cured by ultraviolet curing, and the transfer layer is subsequently formed in the same manner. The examples of conventional methods further include a method (refer to Patent Document 2) where a flexible organic sheet is heated beyond the softening point thereof, the pattern is transferred by pressure bonding using the stamper, and the sheet and the stamper are subsequently cooled and separated.

Prior art includes a direct emboss method as disclosed in Patent Document 3, for example, where a transparent film is bonded by thermocompression. In the technique, as pressure bonding is performed after the heating, it is difficult to extremely uniform thermal unevenness and stress unevenness on a surface. Thus, unevenness is likely to be generated on optical characteristics, mechanical strength, warping, and the like. In addition, it is necessary to strictly control the accuracy of parallelism among the stamper, the film, and a plate for pressure.

Figure 5:
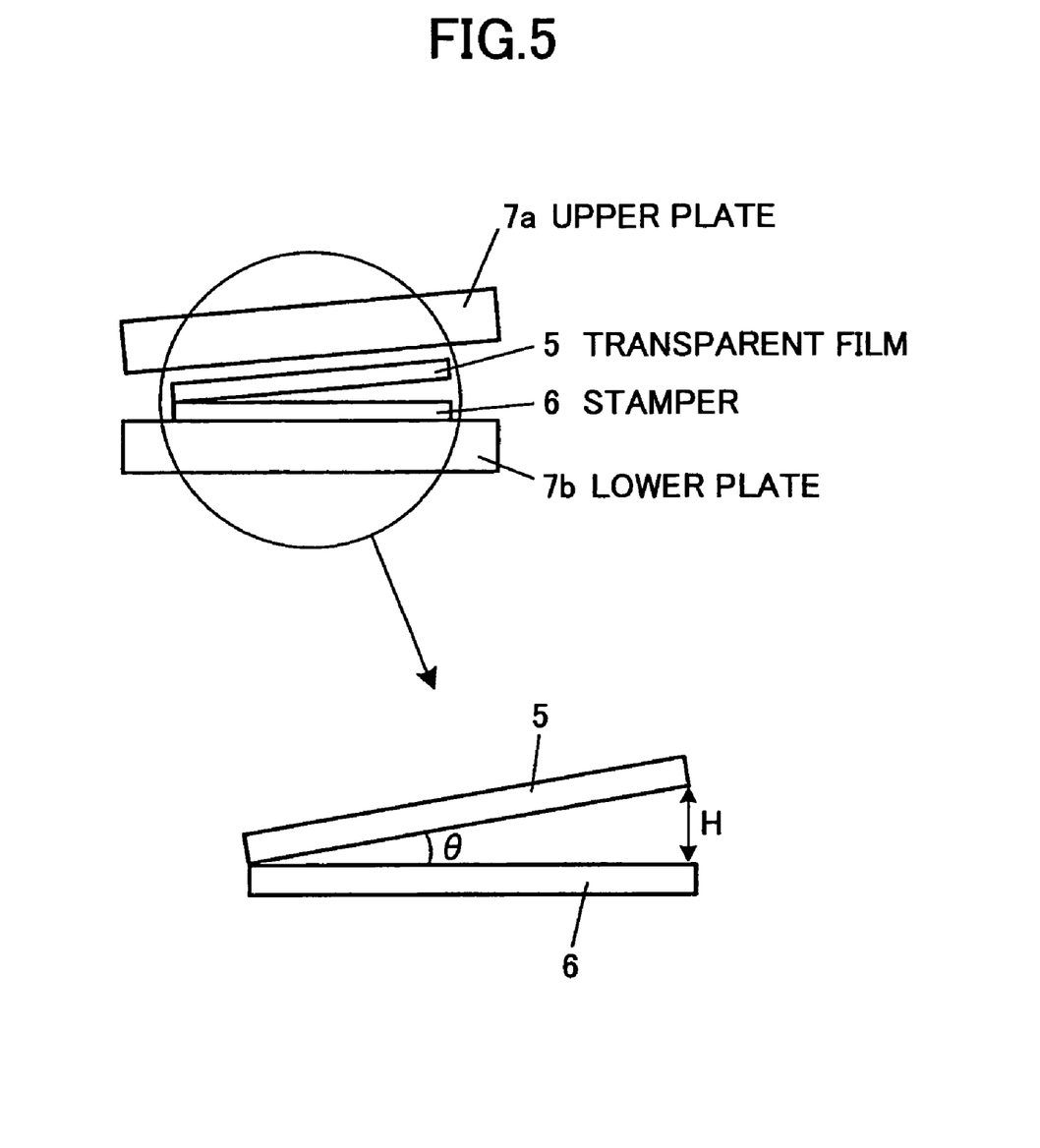
FIG. 5 is a schematic diagram showing a direct emboss method by which a transparent film is bonded by thermocompression.

Here, with reference to FIG. 5, it is assumed that a stamper 6 is tilted θ with respect to a film 5 regarding the accuracy of parallelism among the stamper 6 and upper and lower plates 7a and 7b for pressure. When the size of a CD or a DVD is assumed have φ 120 mm, generated heights Hs are values as shown in numerical formula 1.

When θ=one degree, H=120×sin(one degree)=2 mm.

When θ=ten minutes(¹⁰⁄₆₀deg.), H=120×sin(ten minutes)=30 μm.

When θ=one minute (¹⁄₆₀deg.), H=120×sin(one minute)=3 μm.     Numerical formula 1

A preformat pattern of a flexible optical disc has a depth of about several tens of nm to 0.1 μm. Thus, even when the tilt θ of the film 5 with respect to the stamper 6 is one minute, a gap of 3 μm is generated, so that even if pressure power is applied thereto, it is not considered that the gap is completely eliminated. In other words, transfer unevenness is increased.

On the other hand, the 2P method is superior in transferability and its potential in this respect is superior to other transfer methods. In the 2P method, the thickness of the flexible optical disc is a summation of the film for transfer, the transfer layer, and the like. The film per se is industrially mass-produced, so that the thickness distribution thereof is about ±1 μm. However, although a general film has a thickness amplitude of about ±1 μm, thickness in the circumferential direction greatly changes such that it has a spike-like form. Also, in a case where resin is spread on the stamper by the 2P method, and thereafter, the stamper and the film are attracted using the upper and lower plates and adhered together, if a tilt is generated between the stamper and the film, transfer unevenness is increased in the same manner as in the aforementioned direct emboss method. In particular, in the case of the 2P method, since not much pressure can be applied as compared with the direct emboss method, it is almost impossible to modify the tilt.

Patent Document 1: Japanese Patent No. 2942430
Patent Document 2: Japanese Laid-Open Patent Application No. 6-60423
Patent Document 3: Japanese Laid-Open Patent Application No. 11-273147

SUMMARY OF THE INVENTION

It is a general object of the present invention to reduce the unevenness of the thickness of the substrate for a flexible transfer body employing curable resin as a transfer material.

A more specific object of the present invention is to provide methods for manufacturing a flexible transfer body and a flexible optical disc in which the unevenness of the thickness of a transfer layer thereof is reduced and the thickness is made to be uniform and to provide a flexible optical disc manufactured by such a method.

When the surface deflection of a flexible optical disc is reduced using an air bearing formed between the guide and the flexible optical disc, the surface deflection can be reduced using the film or the flexibility of the flexible optical disc.

On the other hand, since the follow-up ability of focusing servo control is limited in a high-frequency range of the surface deflection, the follow-up ability of the focusing servo control increases focus errors and reduces recording and reproduction accuracy. This is greatly problematic upon improving the recording capacity and the recording and reproduction speed of the flexible optical disc.

When frequency components of the surface deflection of the flexible optical disc are analyzed, the high-frequency range of the surface deflection is turned out to be greatly dependent on the unevenness of the thickness of the film used as a substrate.

The waviness of the flexible optical disc is substantially corrected by the air bearing and the amount of the surface deflection resulting from the waviness has vibration amplitude in a low-frequency range, so that the focusing servo control is capable of following in the range. Thus, an influence on the generation of focus errors is small. However, the flexible optical disc is rotated at a high-speed while maintaining a certain clearance between a back surface thereof and the guide, so that the unevenness of the board thickness of the substrate generates surface deflection on the front surface due to the rotation. In particular, the unevenness of the thickness of the back surface has a huge influence, the back surface having concavity and convexity and positioned closely to the guide. And surface deflection due to the unevenness of the thickness of the film widely exceeds vibration amplitude in the high-frequency range within which the focusing servo control is capable of following, so that residual focus errors are considered to be increased.

In other words, it is necessary to minimize the birefringence of the cover layer (film) required for the aforementioned Blu-ray discs since a function of an optical transmission layer is needed. By contrast, because the optical disc system is of surface recording type, the optical characteristics of the disc may be free of limitation. However, it is necessary to minimize characteristics regarding the surface properties thereof.

In order to achieve the aforementioned object, a method for manufacturing a flexible transfer body according to one aspect of the present invention concerns a method for manufacturing a flexible transfer body employing curable resin as a transfer material. The method comprises the steps of: coating liquid curable resin onto the rotation center or the vicinity of the rotation center of a mold, which is a rotator having a functional form on the surface thereof; bringing a flexible film into contact with the surface of the coated curable resin in a liquid state; spreading the curable resin to the circumferential edge of the mold by a centrifugal force; curing the curable resin by supplying chemical or thermal energy thereto; and separating the curable resin from the mold. As a result, a flexible transfer body in which the curable resin is transferred to the film is obtained.

A method for manufacturing a flexible optical disc according to another aspect of the present invention concerns a method for manufacturing a flexible optical disc employing curable resin as a transfer material. The method comprises the steps of: coating liquid curable resin onto the rotation center or the vicinity of the rotation center of a stamper, which is a rotator having a preformat pattern on the surface thereof; bringing a flexible film into contact with the surface of the coated curable resin in a liquid state; spreading the curable resin to the circumferential edge of the stamper by a centrifugal force; curing the curable resin by supplying chemical or thermal energy thereto; and separating the curable resin from the stamper. As a result, a flexible optical disc in which the curable resin is transferred to the film is obtained.

Methods for manufacturing a flexible optical disc according to another aspect of the present invention concern the method for manufacturing a flexible optical disc mentioned above. The methods are characterized in that upon bringing the flexible film into contact with the surface of the coated curable resin in a liquid state, the form of the film includes a concave or U-shaped form when viewed edge-on or the film is controlled from the outside such that it has such a form, and that a protection film is adhered to a surface opposite to the surface of the flexible film brought into contact with the curable resin in a liquid state.

A flexible optical disc according to another aspect of the present invention concerns a flexible optical disc manufactured by the method for manufacturing a flexible optical disc mentioned above. The flexible optical disc is characterized in that a guide is positioned closely to the opposite side of a transfer surface, which is a recording/reproduction surface of surface recording type, so that the flexible optical disc is aerodynamically stabilized.

According to the aforementioned manufacturing method, regarding the flexible transfer body and the flexible optical disc employing curable resin as a transfer material, a high-quality flexible medium capable of controlling surface deflection can be obtained by reducing the unevenness of the thickness of the substrate and the transfer layer thereof.

According to the present invention, in the flexible transfer body and the flexible optical disc employing curable resin as a transfer material, the unevenness of the thickness of the substrate and the transfer layer thereof can be reduced and the transfer material can be uniformly transferred, thereby obtaining a high-quality flexible medium capable of controlling surface deflection.

DESCRIPTION OF THE PREFERRED EMBODIMENTS

In the following, an embodiment of the present invention will be described in detail with reference to the accompanying drawings.

Figure 1:
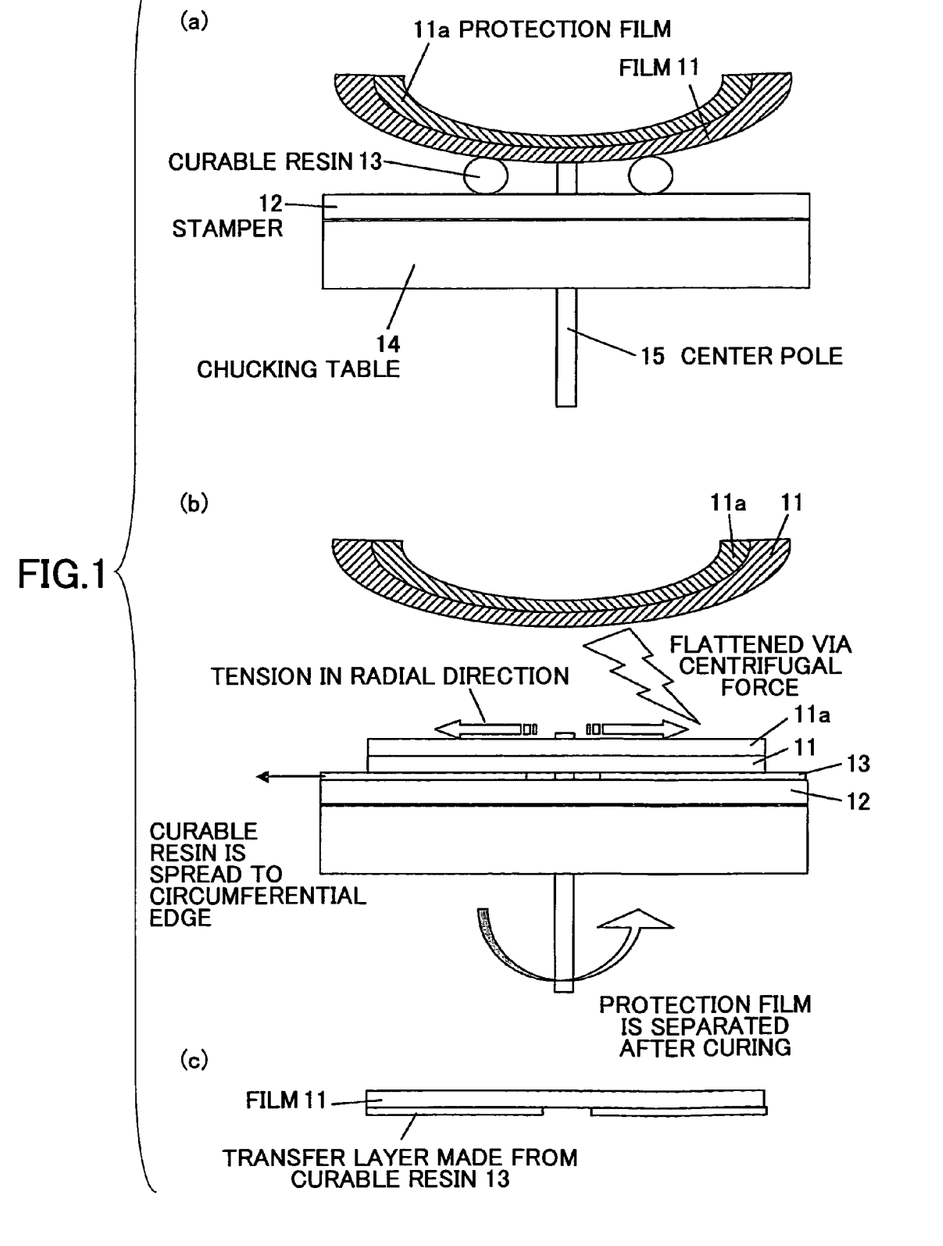
FIG. 1 is a schematic diagram showing a method for manufacturing a flexible transfer body according to an embodiment of the present invention.

FIG. 1 is a schematic diagram showing a method for manufacturing a flexible optical disc as a flexible transfer body in an embodiment of the present invention.

According to the method for manufacturing a flexible optical disc of the present embodiment, as shown in FIG. 1-(a), curable resin 13 is coated onto the rotation center or the vicinity of the rotation center of a stamper 12, which is a mold that has a functional form of a preformat pattern on the surface thereof. Then, as shown in FIG. 1-(b), a flexible film 11 is brought into contact with the surface of the coated curable resin 13 in a liquid state and the curable resin 13 is spread to the circumferential edge of the stamper 12 by a centrifugal force. In this manner, air is unlikely to be involved in the curable resin 13 and tension is uniformly applied to the film 11 in a radial direction due to the centrifugal force upon rotation, thereby disposing the film 11 in parallel with the stamper 12. By spreading the curable resin 13 to the circumferential edge in the parallel clearance formed by the stamper 12 and the film 11, the thickness of the resultant layer of the curable resin 13 can be uniform.

In addition, in order to selectively bring the flexible film 11 into contact with the surface of the coated curable resin 13 in a liquid state, the form of the flexible film 11 includes a concave or U-shaped form when viewed edge-on or the flexible film 11 is controlled from the outside such that it has such a form. One method may be that by adhering a protection film 11a to a surface opposite to the surface of the flexible film 11 brought into contact with the curable resin 13 in a liquid state, the form of the flexible film 11 can be of a concave or U-shaped form when viewed edge-on since compressive stress is generally applied to the protection film 11a side.

In particular, if the curable resin 13 includes a photopolymer material (monofunctional acrylate monomer material, for example) which does not form a cross-linked structure upon curing, molecular weight distribution of the material per se is narrow. Thus, a transfer layer having extremely good smoothness can be obtained without the generation of microgels due to uncured low-molecular materials in the inside while high-polymer materials in the periphery are cured. After the curable resin 13 is cured by supplying chemical or thermal energy thereto, a flexible optical disc with a uniform thickness can be obtained by separating the curable resin 13 (refer to FIG. 1-(c)).

One example of the flexible transfer body as mentioned above includes a flexible optical disc. The curable resin 13 is coated onto the rotation center or the vicinity of the rotation center of the stamper 12 having a preformat pattern. The film 11 is brought into contact with the coated curable resin 13 in a liquid state and the curable resin 13 is spread to the circumferential edge of the stamper 12 by a centrifugal force. And the curable resin 13 is cured and separated from the stamper 12, thereby obtaining the flexible optical disc.

The obtained flexible optical disc has good flatness and uniform thickness including the extremely uniform film 11 in which the thickness unevenness of given 1/100 of the circumferential sections in the circumferential direction at a given radius position of the flexible film 11 is not more than 0.1 μm. Moreover, with respect to the parallel clearance formed by the stamper 12 and the film 11, the curable resin 13 is cured after being spread to the circumferential edge. Thus, the thickness unevenness of given 1/100 of the circumferential sections in the circumferential direction at a given radius position of the transfer layer including the curable resin 13 is not more than 0.1 μm.

The curable resin 13 causes a shrinkage reaction upon curing, so that the thickness of the layer of the curable resin 13 is required to be thin so as to mitigate the influence of the curing shrinkage. Preferably, the material of the curable resin 13 includes a monofunctional acrylate monomer material with a viscosity of 10 to 100 mPa·s. Since the thickness of the substrate film 11 ranges from 30 to 300 μm, a well-balanced air baring is formed. Thus, the surface deflection of the flexible optical disc can be reduced and residual focus errors can be extremely reduced, thereby achieving high-quality recording and reproduction characteristics.

In addition, examples of the flexible disc are not limited to optical discs but include magnetic discs such as floppy discs (registered trademark). The same process mentioned above can be partially applied to such discs. Except for a case where a magnetic layer is formed on a rolled film, when a magnetic layer is formed on a film processed to have a disc size, the magnetic layer can be formed to have a uniform thickness by coating the film with the magnetic layer while applying tension thereto by a centrifugal force. Moreover, the floppy discs (registered trademark) require no transfer process using the fine form of the stamper, since it is not necessary to transfer and form the preformat form required for optical discs.

The preparation of microlens arrays involves the same problem that even if a lens form per se can be uniformly transferred, when the thickness of a transfer resin layer per se is uneven or when a substrate per se has a tilt, the height of the microlens array becomes uneven as a result and an optical axis direction of the microlens array becomes tilted. Thus, in an optical system of an electrophotographic apparatus such as a copying machine, sufficient functional quality cannot be obtained, which may result in the degradation of picture quality. However, by using the same process as mentioned above, the transfer form can be uniform and the thickness of the transfer layer can be uniform, thereby obtaining high-quality microlens arrays without having unevenness of the height in the microlens arrays.

In the following, the structure of the flexible transfer body and a manufacturing method thereof according to the present embodiment are described with reference to FIG. 1.

Figure 2:
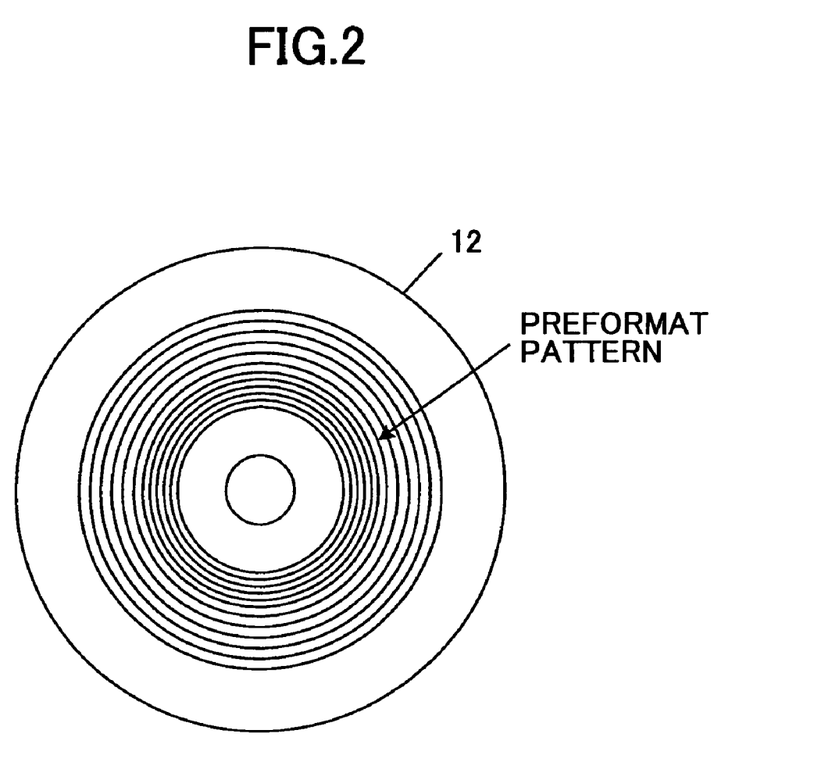
FIG. 2 is a plan view showing a stamper having a preformat pattern in example 1 of the present embodiment.

FIG. 2 is a plan view showing the stamper having a preformat pattern in example 1 of the present embodiment.

Nonylphenoxyethyl acrylate (viscosity: 80 mPa·s) as a monofunctional acrylate monomer material which does not form a cross-linked structure upon curing is coated onto the surface of the stamper 12 as shown in FIG. 2 in a toroidal manner relative to a given radius position in the inner circumference, the nonylphenoxyethyl acrylate being employed for the curable resin 13. A PC (polycarbonate) film with a thickness of 100 μm as the film 11 is selectively brought into contact with the coated curable resin 13 in a liquid state, the polyethylene protection film 11a being adhered to the back surface of the PC film. The curable resin 13 is spread to the circumferential edge by rotating the stamper 12 and the curable resin 13 is cured by being irradiated with ultraviolet light. Then, the resultant substance in which the PC film and the curable resin 13 are adhered to each other is separated from the stamper 12 and subjected to the formation of a recording film, for example, thereby completing a flexible optical disc.

The flexible optical disc is rotated using an evaluation apparatus as shown in FIG. 4 and the guide 2 is positioned closely thereto, so that the surface deflection of the flexible optical disc is reduced by an air flotation. Recording and reproduction are performed after the focusing and tracking servo controls are locked. In the constitution of example 1, the surface deflection of the flexible optical disc is reduced, so that high-quality recording and reproduction characteristics are obtained.

In example 2 of the present embodiment, tricyclodecanyl oxyacrylate (viscosity: 12 mPa·s) as a monofunctional acrylate monomer material which does not form a cross-linked structure upon curing is coated onto the surface of the stamper 12 in a toroidal manner relative to a given radius position in the inner circumference, the tricyclodecanyl oxyacrylate being employed for the curable resin 13. A PET film with a thickness of 75 μm as the film 11 is selectively brought into contact with the coated curable resin 13 in a liquid state, the polyethylene protection film 11a being adhered to the back surface of the PET film. The curable resin 13 is spread to the circumferential edge by rotating the stamper 12 and the curable resin 13 is cured by being irradiated with ultraviolet light. Then, the resultant substance in which the PET film and the curable resin 13 are adhered to each other is separated from the stamper 12 and subjected to the formation of a recording film, for example, thereby completing a flexible optical disc.

In example 2, the surface deflection of the flexible optical disc is reduced, so that high-quality recording and reproduction characteristics are obtained in the same manner as in example 1 mentioned above.

In example 3 of the present embodiment, tetrahydrofurfuryl oxyhexanolide acrylate (viscosity: 20 to 200 mPa·s) as a monofunctional acrylate monomer material which does not form a cross-linked structure upon curing is coated onto the surface of the stamper 12 in a toroidal manner relative to a given radius position in the inner circumference, the tetrahydrofurfuryl oxyhexanolide acrylate being employed for the curable resin 13. A ZeonorFilm (registered trademark) with a thickness of 100 μm as the film 11 is selectively brought into contact with the coated curable resin 13 in a liquid state, the polyethylene protection film 11a being adhered to the back surface of the ZeonorFilm (registered trademark). The curable resin 13 is spread to the circumferential edge by rotating the stamper 12 and the curable resin 13 is cured by being irradiated with ultraviolet light. Then, the resultant substance in which the ZeonorFilm (registered trademark) and the curable resin 13 are adhered to each other is separated from the stamper 12 and subjected to the formation of a recording film, for example, thereby completing a flexible optical disc.

In example 3, the surface deflection of the flexible optical disc is reduced, so that high-quality recording and reproduction characteristics are obtained in the same manner as in example 1 mentioned above.

Figure 3A:
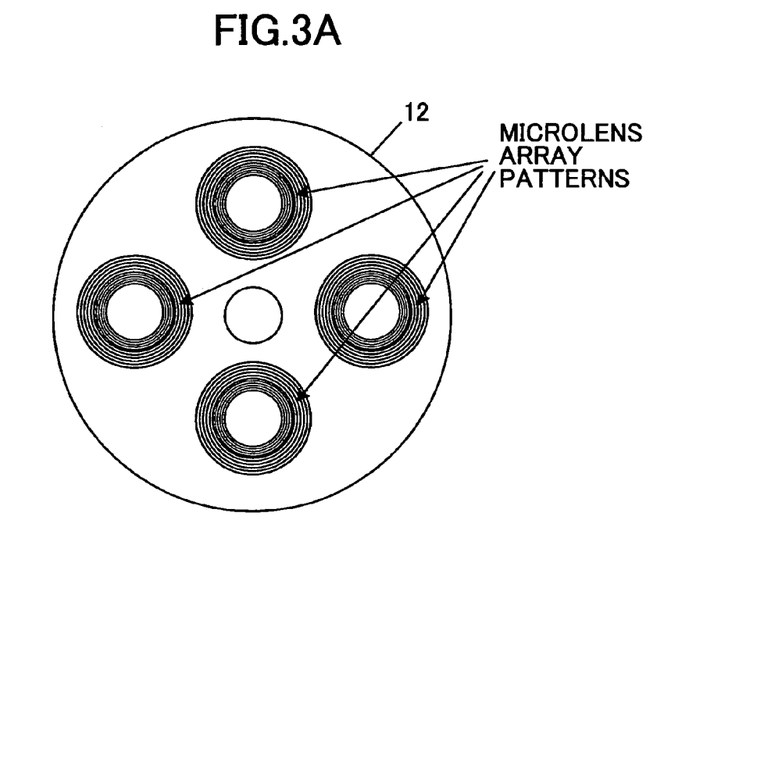
FIG. 3A is a plan view showing a stamper having a plurality of patterns for a group of microlens arrays in example 4 of the present embodiment.

FIG. 3A is a plan view showing a stamper having a plurality of patterns for a group of microlens arrays in example 4 of the present embodiment. Nonylphenoxyethyl acrylate (viscosity: 80 mPa·s) as a monofunctional acrylate monomer material which does not form a cross-linked structure upon curing is coated onto the surface of the stamper 12 as shown in FIG. 3A in a toroidal manner relative to a given radius position in the inner circumference, the nonylphenoxyethyl acrylate being employed for the curable resin 13. A PC film with a thickness of 100 μm as the film 11 is selectively brought into contact with the coated curable resin 13 in a liquid state, the polyethylene protection film 11a being adhered to the back surface of the PC film. The curable resin 13 is spread to the circumferential edge by rotating the stamper 12 and the curable resin 13 is cured by being irradiated with ultraviolet light. Then, the resultant substance in which the PC film and the curable resin 13 are adhered to each other is separated from the stamper 12, thereby obtaining a transfer body of microlens arrays.

Figure 3B:
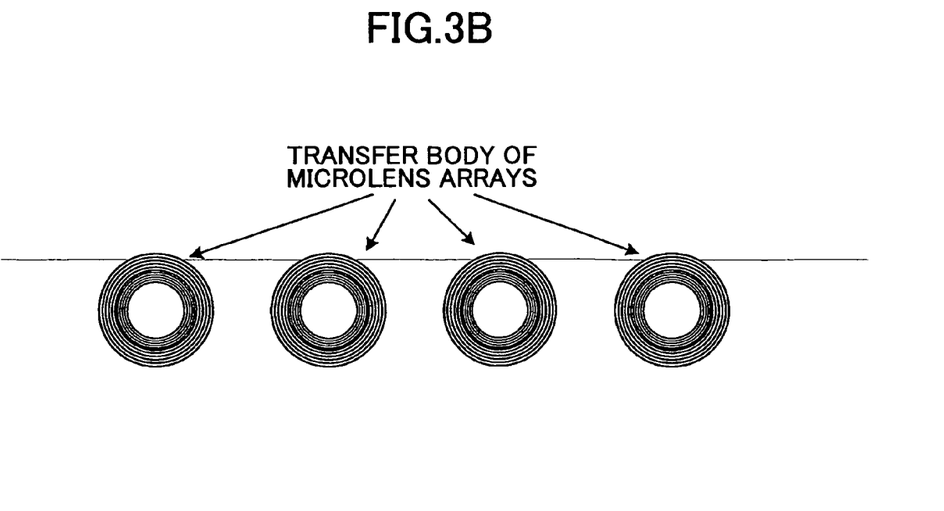
FIG. 3B is a plan view showing a multiple microlens arrays in example 4 of the present embodiment.

By cutting a plurality of groups of microlens arrays into desired forms, multiple microlens arrays can be obtained, consequently, by a single transfer (refer to FIG. 3B). Accordingly, this can be applied as high-quality microlens arrays to a writing or reading optical system such as a copying machine in which almost no height unevenness generated in the microlens arrays since the transfer form is uniform and also the thickness of the transfer layer is uniform.

In addition, a flexible optical disc is prepared as a comparative example of the present embodiment. A polyfunctional acrylate monomer material (viscosity: 10000 mPa·s, curing shrinkage: 3%) which forms a cross-linked structure upon curing is coated onto the surface of the stamper 12 in a toroidal manner relative to a given radius position in the inner circumference. A PET film with a thickness of 100 μm as the film 11 is selectively brought into contact with the coated curable resin 13 in a liquid state, the polyethylene protection film 11a being adhered to the back surface of the PET film. The curable resin 13 is spread to the circumferential edge by rotating the stamper 12 and the curable resin 13 is cured by being irradiated with ultraviolet light. Then, the resultant substance in which the PET film and the curable resin 13 are adhered to each other is separated from the stamper 12 and subjected to the formation of a recording film, for example, thereby completing the flexible optical disc.

In this reference example, innumerable microgels are observed on the surface appearance of the transfer layer resulting from the curable resin 13. This generates concavity and convexity with a height of about 1 μm on the surface of the transfer layer and thus provides thickness unevenness. As a result, a transfer layer having a smooth surface cannot be obtained. Therefore, due to the combination of the thickness unevenness in the film substrate and the transfer layer, it is impossible to lock even the focusing servo control, so that the optical disc cannot provide functionality any more.

The methods for manufacturing a flexible transfer body and a flexible optical disc according to the present invention and the flexible disc manufactured by such a method are capable of, regarding a flexible transfer body and a flexible optical disc employing curable resin as a transfer material, reducing the unevenness of the thickness of the substrate and the transfer layer thereof and also capable of uniformly transferring the transfer material, thereby obtaining a high-quality flexible medium capable of controlling surface deflection. This is useful as methods for manufacturing a flexible transfer body and a medium for a flexible optical disc.

The present invention is not limited to the specifically disclosed embodiment, and variations and modifications may be made without departing from the scope of the present invention.

The present application is based on Japanese priority application No. 2005-055870 filed Mar. 1, 2005, the entire contents of which are hereby incorporated herein by reference.

What is claimed is:

1. A method for manufacturing a flexible transfer body employing curable resin as a transfer material, comprising the steps of:

coating liquid curable resin onto a rotation center or the vicinity of the rotation center of a mold, which is a rotator having a functional form on a surface thereof;

bringing a flexible film with a thickness ranging from 30 to 300 μm into contact with a surface of the coated curable resin in a liquid state and subsequently spreading the curable resin to the circumferential edge of the mold by a centrifugal force;

adhering a protection film to a surface of the flexible film opposite to a surface of the flexible film that is brought into contact with the curable resin in a liquid state;

causing the flexible film to have a concave or U-shaped form in an edge-on view when adhering the protection film to the surface of the flexible film, by a compressive stress applied from the protection film to the flexible film; and curing the curable resin by supplying chemical or thermal energy thereto and separating the curable resin from the mold, thereby obtaining a flexible transfer body in which the curable resin is transferred to the film.

2. The method of claim 1, wherein the flexible transfer body includes a flexible optical disc, and the mold includes a stamper that is a rotator having a preformat pattern on a surface thereof.

3. The method of claim 1, the curable resin includes a photopolymer material does not form a cross-linked structure upon curing.

4. The method of claim 1, the flexible transfer body includes magnetic discs such as floppy discs.

5. The method of claim 2, the stamper includes a plurality of patterns for a group of microlens arrays.

* * * * *